Oct. 11, 1949.

F. G. STOCK 2,484,474

PISTON

Filed May 4, 1945

FREDERICK G. STOCK
INVENTOR.

BY

ATTORNEY

Patented Oct. 11, 1949

2,484,474

UNITED STATES PATENT OFFICE 2,484,474

PISTON

Frederick G. Stock, Dallas, Tex.

Application May 4, 1945, Serial No. 591,978

12 Claims. (Cl. 309—4)

1

This invention relates to new and useful improvements in pistons, and particularly those for use in pumps, such as slush pumps and the like.

Pistons of this character are usually formed with a body of steel or other metal which fits on the tapered end of a piston rod and is secured thereon by a jam nut. The pistons are customarily equipped with ring-like packing cups of leather, rubber or other similar resilient materials for sealing against the bore of the cylinder.

As the pistons are used, the packing wears away and must be replaced. In all piston assemblies heretofore in use it has been necessary to remove the jam nut, the piston body and the piston packing from the rod in order to replace the worn packing.

It is, therefore, a particular object of this invention to provide a piston which is adapted to be repacked without disturbing the pump rod, piston body or jam nut.

A further object of the invention is to provide a piston, of the character described, wherein the packing is secured in the assembly in such a manner as to provide for a tight seal of the complete packing assembly and for adjustment of the oppositely facing packing members.

A principal object of the invention is to provide a piston of the character described which may be utilized with standard pump rods.

Another important object of the invention is to provide, in a piston of the character described, means for forming a seal to prevent leakage of fluid pressure between the packing elements and the piston body.

A still further object of the invention is to provide a replaceable ring between the oppositely facing packing elements for assuring that fluids do not leak between said elements.

Still another object of the invention is to provide a pump piston wherein either or both of the oppositely facing packing elements may be removed and replaced without removing the piston body from the pump rod.

Figure 1:
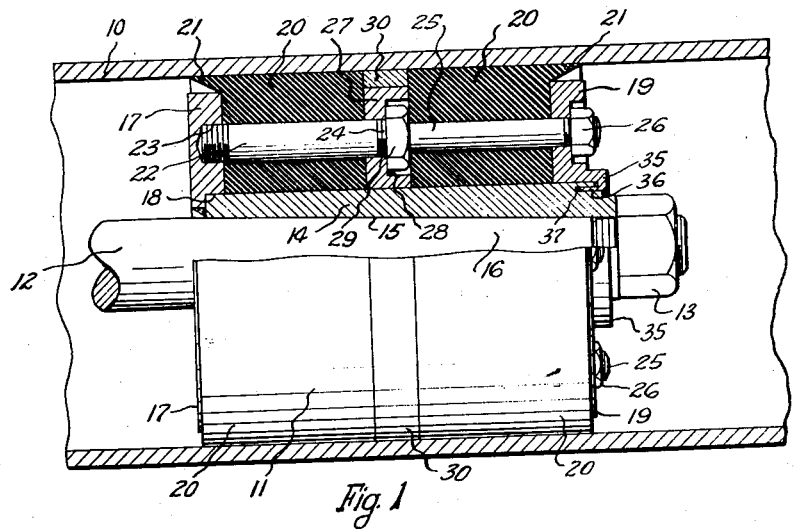
Figure 3:
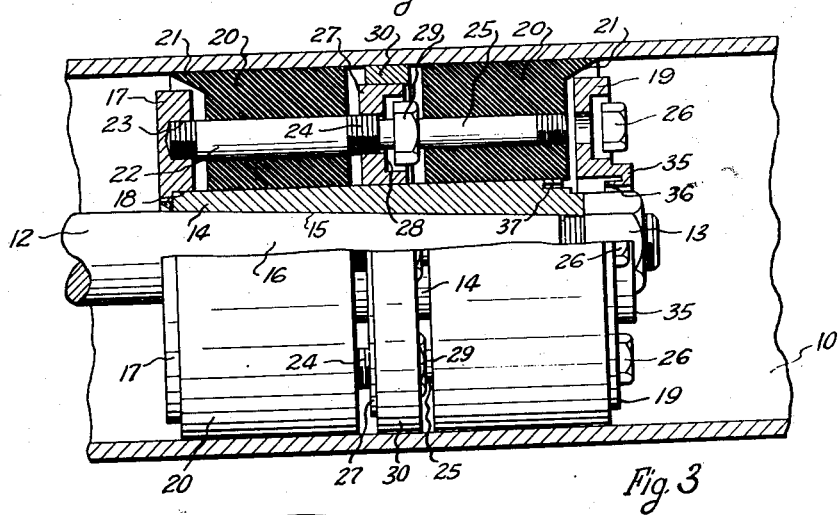
Figure 2:
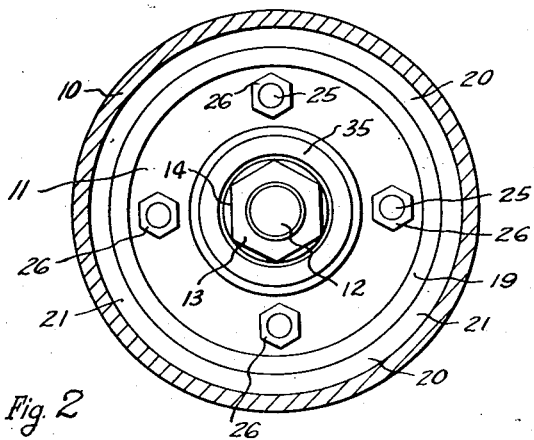

Additional objects and advantages of the invention will be apparent from a reading of the following description of a device constructed in accordance with the invention, and reference to the accompanying drawings thereof, wherein:

Figure 1 is a view, partly in elevation and partly in section, of a piston constructed in accordance with the invention, Figure 2 is an end view of the piston, and Figure 3 is a view similar to Figure 1 in which the various parts of the piston are shown in slightly spaced relation to better illustrate their

2 construction and the manner in which the parts may be removed from the piston body and pump rod without removing the body or jam nut from the rod.

In the drawings, the numeral 10 designates a portion of the cylinder of the pump, such as a slush pump or similar apparatus, wherein a fluid is acted upon by a piston assembly 11 under high working pressures. The piston is movable in a reciprocating motion within the cylinder by means of a piston rod 12 to build up fluid pressure in the usual manner. The piston assembly is held in fixed position on the piston rod by means of a jam nut 13.

The piston assembly includes an elongate substantially cylindrical body member 14 having a tapered bore 15 which is adapted to slide on and fit closely the tapered end 16 of the pump rod, being secured thereon by the jam nut 13. A disc-like clamping ring 17 having a counterbore 18 adapted to receive the inner end of the body 14 is fitted securely on the inner end of the body 14, and may be secured to said body by welding or otherwise, if desired. Another substantially disc-like clamping ring 19 having a bore slightly larger than the external diameter of the body is slidable on the outer end of the body 14, and a pair of oppositely facing annular packing elements 20 having flared sealing lips 21 are secured between the rings 17 and 19 by means of bolts 22.

The inner end of each bolt is secured by means of screw threads within a recess 23 formed in the ring 17. If desired, the bolts may be welded or otherwise affixed to the disc-like ring 17. The central portion of each bolt is screw threaded, as clearly shown at 24 in Figures 1 and 3, and the outer portion of the bolt beyond the central screw threads 24 is reduced in diameter, as illustrated at 25. The extreme outer end of the bolt is provided with screw threads and a clamping nut 26 is threaded thereon to hold the disc-like ring 19 in place.

Between the oppositely facing packing elements 20, a central spacing and clamping ring 27, having an annular groove 28 formed in one of its faces, is secured on the body by means of nuts 29 which are adapted to fit in the annular groove 28 and which are screwed onto the central threaded portion 24 of the bolts, said nuts providing for adjustment of the clamp rings and the packing therebetween. A sealing ring 30, which may be of plastic or other material, surrounds the central ring 27 and is adapted to engage the inner surfaces of each of the packing elements 20 adjacent their periphery to form a seal between said elements to prevent leakage of fluid therebetween.

For preventing fluids from entering between the body 14 and the bores of the packing elements 20, the outer disc-like ring 19 is provided with a substantially U-shaped annular flange 35, and the inwardly directed open arm 36 of this flange is adapted to slide closely within an annular recess 37 formed in the outer end of the piston body 14. It will be noted that the depth of the annular recess 37 is such that the arm 36 may have a limited movement longitudinally of the body as the ring 19 is moved or tightened by adjusting the nut 26. The sliding fit of the arm 36 of the flange within the recess 37 provides a seal between the ring 19 and the body 14.

It is to be noted that the bores of the ring 19 and the flange 35 are larger than the external diameter of the jam nut 13, whereby said ring may be slid off the body without removing said jam nut. Furthermore, all the other parts, the packing elements 20, the central packing ring 27 and the nuts 29 may be removed from the piston body without the necessity of removing the jam nut 13 or the piston body from the piston rod 12. This disassembly is clearly illustrated in Figure 3 of the drawings.

It will readily be seen, therefore, that either or both of the packing elements of the piston may be removed from the piston body and new packing elements installed thereon without the necessity of removing the jam nut or piston body from the piston rod. It will further be seen that the entire piston assembly is readily adapted for use with a standard pump rod.

Furthermore, the nuts 29 and 26 provide for adjustment of the rings 27 and 19 to tightly clamp the packing elements 20 in the assembly and thus reduce the possibility of leakage. Also, it is pointed out that the U-shaped annular flange 35, engaging within the recess 37 formed on the outer end of the body 14, provides a seal for preventing fluid leakage between the packing member 20 and the body. Likewise, the annular sealing ring 30 prevents leakage of fluid between the inner portions of the packing elements 20.

The foregoing description of the invention is explanatory only, and changes in details of the constructions illustrated may be made by those skilled in the art, within the scope of the appended claims, without departing from the spirit of the invention.

What I claim and desire to secure by Letters Patent is:

1. A piston including, a piston body adapted to be secured on a pump rod by a jam nut, packing means carried by said piston body, and means independent of and spaced from the pump rod and jam nut for securing and adjustably compressing said packing means on said body and arranged to permit removal of said packing means from one end of said body without removing the jam nut or piston body from the pump rod.

2. A piston including, a piston body adapted to be mounted on a pump rod and to be secured thereon by a jam nut, packing means carried by said body, adjustable means securing and adjustably compressing said packing means on said body, said adjustable means being independent of and spaced from the pump rod and jam nut and providing for removal of the packing means from the body without disturbing the body or jam nut.

3. A piston including, an elongate tubular piston body having a tapered bore and adapted to be secured on the tapered end of a piston rod by a jam nut, an annular disc-like flange at one end of the body, a disc-like head member at the other end of the body, packing means on said body between the flange and head, and securing means fixed on the flange and adjustably co-acting with the head member to secure the packing means on the body between the flange and head member, said head member and packing means being removable from the body without removing the body or jam nut from the piston rod.

4. In a piston having a body member and packing means carried by the body and retained thereon by a rigid retaining member, means for sealing between the body and packing means including, telescoping cylindrical flange members on the body and the rigid retaining member for the packing means.

5. A piston including, an elongate tubular piston body having a tapered bore and adapted to be secured on the tapered end of a piston rod by a jam nut, said body having an external diameter greater than the major diameter of the jam nut, packing means carried by said piston body, and adjustable means securing said packing means on said body.

6. A piston including, a tubular body member, clamping rings at the ends of the body, packing members on the body between the clamping rings, a spacer ring between the packing members, and a non-metallic substantially non-flexible ring encircling the spacer ring and engaging the packing members to form a seal therebetween.

7. A piston as set forth in claim 6, wherein the body member is adapted to be secured on a piston rod by a jam nut, and the packing means, spacer ring, non-flexible ring and one clamping ring are removable from the body member without removing the jam nut or body member from the piston rod.

8. In a piston having a body member and packing means carried by the body member, means for sealing between the body member and packing means including, a clamping ring having an axial annular cylindrical flange, and an axial annular cylindrical flange on the body member adapted to telescope the flange on the clamping ring.

9. In a piston having a body member and packing means carried by the body member, means for sealing between the body member and packing means including, a clamping ring engaging the packing means and having an axial annular cylindrical flange extending coaxially into the bore of the ring and spaced from the wall of said bore, and an axial annular cylindrical flange forming a continuation of the external surface of the body member and adapted to telescope between the bore wall and flange of the clamping ring to provide a seal between said ring and body member.

10. A piston including, a tubular piston body member adapted to be secured on a piston rod by a jam nut and having an external diameter greater than the major diameter of the jam nut, packing means carried by said body member, and adjustable means independent of and adjustably compressing the jam nut for securing and spaced from the piston rod and said packing means on said body, said adjustable means being releasable to permit removal of the packing means from the body member without removing the body member or jam nut from the piston rod.

11. A piston including, a tubular body member adapted to be secured on a piston rod by a jam nut and having an external diameter greater than the maximum diameter of the jam nut, clamping rings at the ends of the body, packing means on said body between the clamping rings, and adjustable means connecting the clamping rings for securing the packing means between said rings, said adjustable means being releasable to permit removal of the packing means from the body.

12. A piston, including, a tubular body adapted to be secured on a piston rod, packing means on said body, adjustable means for securing and adjustably compressing said packing means on said body independent of and spaced from the piston rod and the means for securing the body on the piston rod, said means being releasable to permit complete removal of the packing means from the body, such removal being effected from the outer or head end of the body.

FREDERICK G. STOCK.

REFERENCES CITED

The following references are of record in the file of this patent:

UNITED STATES PATENTS

| Number | Name | Date |
|---|---|---|
| 244,151 | Skinnen | July 12, 1881 |
| 934,125 | Young | Sept. 14, 1909 |
| 1,185,355 | Smith | May 30, 1916 |
| 2,062,808 | Davis | Dec. 1, 1936 |
| 2,315,012 | Park | Mar. 30, 1943 |
| 2,317,122 | Volpin | Apr. 20, 1943 |

Certificate of Correction

Patent No. 2,484,474 October 11, 1949

FREDERICK G. STOCK

It is hereby certified that errors appear in the printed specification of the above numbered patent requiring correction as follows:

Column 4, lines 65, 66 and 67, strike out the words "adjustably compressing the jam nut for securing and spaced from the piston rod and" and insert instead *spaced from the piston rod and the jam nut for securing and adjustably compressing*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*